United States Patent
Zhang et al.

(10) Patent No.: US 9,092,090 B2
(45) Date of Patent: Jul. 28, 2015

(54) STRUCTURED LIGHT FOR TOUCH OR GESTURE DETECTION

(75) Inventors: Wei Zhang, Tuen Mun (HK); Zhao Wang, Fanling (HK)

(73) Assignee: Hong Kong Applied Science and Technology Research Institute Co., Ltd., Shatin, New Territories, Hong Kong (CH)

( * ) Notice: Subject to any disclaimer, the term of this patent is extended or adjusted under 35 U.S.C. 154(b) by 459 days.

(21) Appl. No.: 13/474,567

(22) Filed: May 17, 2012

(65) Prior Publication Data

US 2013/0307949 A1   Nov. 21, 2013

(51) Int. Cl.
*H04N 7/18* (2006.01)
*G06F 3/042* (2006.01)

(52) U.S. Cl.
CPC ............ *G06F 3/042* (2013.01); *G06F 3/0425* (2013.01); *G06F 3/0426* (2013.01)

(58) Field of Classification Search
CPC ....... G01B 11/022; G06T 7/60; G06F 3/0426; G06F 3/0425; G06F 3/042; G06F 3/0304; H04N 7/18; H04N 7/183; H04N 9/3141; H04N 9/3176
USPC ......................................................... 348/61
See application file for complete search history.

(56) References Cited

U.S. PATENT DOCUMENTS

| | | | |
|---|---|---|---|
| 6,177,682 B1 | 1/2001 | Bartulovic et al. | |
| 6,710,770 B2 | 3/2004 | Tomasi et al. | |
| 7,660,458 B1 * | 2/2010 | Saric | 382/154 |
| 7,907,781 B2 | 3/2011 | Ivanov et al. | |
| 8,373,678 B2 | 2/2013 | Yamada | |
| 8,427,511 B2 | 4/2013 | Shin | |
| 8,485,668 B2 * | 7/2013 | Zhang et al. | 353/28 |
| 8,491,135 B2 * | 7/2013 | Brown et al. | 353/121 |
| 8,584,029 B1 * | 11/2013 | Gerde et al. | 715/771 |
| 8,676,007 B2 | 3/2014 | Holmgren et al. | 385/33 |
| 8,818,420 B2 * | 8/2014 | Schatzberg et al. | 455/456.6 |
| 2005/0247791 A1 * | 11/2005 | Sado et al. | 235/472.01 |
| 2006/0029296 A1 * | 2/2006 | King et al. | 382/313 |
| 2006/0029396 A1 * | 2/2006 | Mahgerefteh et al. | 398/186 |
| 2006/0098899 A1 * | 5/2006 | King et al. | 382/305 |
| 2007/0201863 A1 | 8/2007 | Wilson et al. | |
| 2008/0018591 A1 * | 1/2008 | Pittel et al. | 345/156 |
| 2008/0113771 A1 * | 5/2008 | Baerlocher et al. | 463/25 |
| 2008/0186701 A1 * | 8/2008 | Omi | 362/231 |
| 2009/0139778 A1 * | 6/2009 | Butler et al. | 178/18.03 |
| 2010/0134446 A1 * | 6/2010 | Lin et al. | 345/175 |

(Continued)

FOREIGN PATENT DOCUMENTS

| | | |
|---|---|---|
| CN | 1477478 A | 2/2004 |
| CN | 101571776 A | 11/2009 |
| CN | 101729628 A | 6/2010 |
| CN | 201859424 U | 6/2011 |
| CN | 102339171 A | 2/2012 |
| CN | 102779001 A | 11/2012 |

OTHER PUBLICATIONS

Ionescu et al, A single sensor NIR depth camera for gesture control, 2014.*

(Continued)

*Primary Examiner* — Shan Elahi

(74) *Attorney, Agent, or Firm* — Berkeley Law & Technology Group, LLP

(57) ABSTRACT

The subject matter disclosed herein relates to optical projection and image detection to detect touch or gesture action.

19 Claims, 6 Drawing Sheets

(56) References Cited

U.S. PATENT DOCUMENTS

| | | | |
|---|---|---|---|
| 2010/0331043 A1* | 12/2010 | Chapman et al. | 455/556.1 |
| 2011/0085211 A1* | 4/2011 | King et al. | 358/474 |
| 2011/0138069 A1* | 6/2011 | Momchilov et al. | 709/231 |
| 2011/0164191 A1* | 7/2011 | Brown | 348/744 |
| 2011/0199335 A1 | 8/2011 | Li et al. | |
| 2011/0292347 A1* | 12/2011 | Zhang et al. | 353/28 |
| 2012/0304284 A1* | 11/2012 | Johnson et al. | 726/19 |
| 2012/0320216 A1* | 12/2012 | Mkrtchyan et al. | 348/164 |
| 2014/0062863 A1* | 3/2014 | Yu et al. | 345/156 |

OTHER PUBLICATIONS

CN App. CN201210180682: First Office Action, Mailed Mar. 3, 2014, 5 Pages.

U.S. Appl. No. 14/102,506 / filed Dec. 11, 2013, 45 pages.

U.S. Appl. No. 14/102,506 / Filing Receipt, Mailed Jan. 3, 2014, 3 Pages.

U.S. Appl. No. 14/102,506 / Notice of Publication, Mailed Apr. 10, 2014, 1 Page.

* cited by examiner

STRUCTURED LIGHT FOR TOUCH OR GESTURE DETECTION

FIELD

The subject matter disclosed herein relates to optical projection and image detection to detect touch or gesture action.

BACKGROUND

It may be desirable to use virtual input devices to enter commands, data, or other information into electronic systems, such as a cellular phone, smart phone, personal data assistant (PDA), laptop computer, and so on. Such electronic devices implemented in relatively small sizes may have relatively small touch screens or mini-keyboards. Entering commands or data may be time consuming or error-prone. For example, cellular telephones, PDAs, or smart phones may allow e-mail communications, but entering messages using a small telephone touch pad may be difficult. For example, a PDA or a smart phone may have much of the functionality of a computer but may suffer from a tiny or non-existent keyboard.

BRIEF DESCRIPTION OF THE DRAWINGS

Non-limiting and non-exhaustive embodiments will be described with reference to the following objects, wherein like reference numerals refer to like parts throughout the various objects unless otherwise specified.

DETAILED DESCRIPTION

Figure 1:
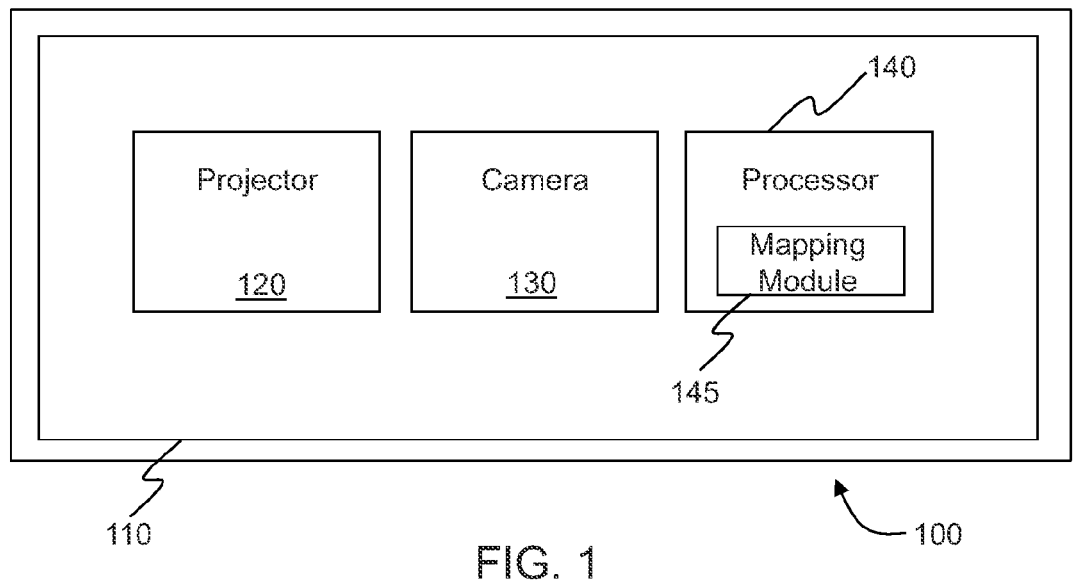
FIG. 1 is a schematic block diagram of an electronic device, according to an embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of terms may provide helpful guidance regarding inferences to be drawn for that context.

Embodiments described herein include an electronic device that may support one or more writing pad functions such as, for example, detecting touch action during entry of commands, data, or other information into the electronic device. For example, a user may enter a command or data into an electronic device via a virtual keyboard displayed on a surface. A user may enter a command or data by touching an image of a key, for example, on a surface. In contrast, a command or data need not be entered into an electronic device if a user merely holds a finger or stylus above such an image of a key so as to not touch the surface. Accordingly, detecting touch action may allow an electronic device to determine whether a user intends to enter a command or data. Moreover, detecting touch action may allow an electronic device to recognize particular hand or finger gestures corresponding to particular commands, for example. Of course, claimed subject matter is not limited to any such details of user interaction with a virtual keyboard.

An electronic device may comprise a portable electronic device, such as a smart phone, cellular phone, PDA, computer notebook or laptop, and so on. For example, an electronic device may determine if a user's fingers or stylus contact (e.g., touch) a virtual keyboard displayed on a surface. In such a case, an electronic device may further determine which fingers of a user contact which virtual keys, or may determine or identify gestures performed by the user's hand or fingers, for example. Terms "finger", "fingers", and "stylus" are used interchangeably herein. Moreover, "touch object" or "object" may be used in lieu of these terms.

A virtual keyboard, for example, may offer a user an alternative to entering commands or data into a portable electronic device (e.g., smart phone, and so on) using a relatively small touch screen or mini-keyboard. A larger size of a virtual keyboard may be convenient for a user entering e-mail or text into a smart phone or cellular telephone, for example.

In one implementation, a virtual keyboard may comprise a surface (e.g., a sheet of paper, a desktop, and so on) that includes a projected image of a keyboard or other input device or interface. A virtual keyboard or other input device or interface may comprise a work surface that need not include sensors or mechanical or electronic components, for example. A surface displaying a virtual keyboard need not actually perform a process of entering commands or data into an electronic device. Instead, an interaction between a touch object (e.g., a user's fingers or stylus) and portions of a work surface, whereon images of keys exist, may be detected by an electronic device to enter information into the electronic device.

In some embodiments, a method of determining whether an object touches a surface may comprise capturing a first image that includes an image of the object proximate to the surface. The term "proximate" means that an object may be touching a surface or the object may not be touching the surface but may be hovering above the surface by some distance of separation. Light may be projected to create a light pattern on the surface. Such a projected light pattern may be determined based, at least in part, on the first image and a surface map of the surface. Embodiments of techniques to develop a surface map of a surface are discussed below. In one implementation, a projected light pattern may comprise a straight line on a flat surface.

A method of determining whether the object touches the surface may further comprise capturing a second image that includes an image of the light pattern superimposed on the object. In one implementation, the object may be determined not to be touching the surface if the light pattern in the second image includes one or more discontinuities, as explained below. On the other hand, the object may be determined to be touching the surface if the light pattern in the second image does not include a discontinuity.

In one embodiment, a mapping relationship between a surface map of a surface and a projector-camera system, as described above, may be determined. Such a mapping relationship may be used to translate among locations on a surface as seen by a camera and locations on the surface as seen from a location of a projector, as explained below.

In some embodiments, a method of determining whether an object touches a surface may comprise detecting a location of a tip of the object based, at least in part, on a first image, as described above, and projecting light to create a light pattern based, at least in part, on the location of the tip of the object and a surface map of the surface.

In other embodiments, a device, apparatus, or system for performing a method of determining whether an object touches a surface may comprise a mapping module to determine a mapping relationship between an image projected on a surface and a captured image of the surface. A projector may be used to produce such a projection image. The projector may also produce a light pattern to project on the surface. In one implementation, a projector may comprise a red-green-blue (RGB) projector. In another implementation, a projector may comprise a projector capable of projecting infrared (IR) light, such as an RGB-IR projector, for example. Accordingly, in a particular implementation, a light pattern produced by a projector may comprise IR light, while a projection image produced by the projector may comprise visible light.

The device, apparatus, or system for determining whether the object touches the surface may further comprise a camera to capture the image of the surface, an image of the light pattern, and an image of the object. An optical axis of the camera may be arranged at a substantially non-orthogonal angle with respect to the surface, for example. In one implementation, a camera may comprise a visible-IR camera, capable of capturing images produced by an RGB-IR projector, for example.

Such a device, apparatus, or system may further comprise a processor to determine whether the object touches the surface based, at least in part, on the image of the light pattern. For example, a processor may determine that an object does not touch a surface if an image of a light pattern includes one or more discontinuities. On the other hand, a processor may determine that an object touches a surface if an image of a light pattern does not include a discontinuity, as described below.

In one implementation, a device, apparatus, or system for determining, among other things, whether an object touches a surface may be incorporated in a mobile device. For example, a smart phone, PDA, portable computer (e.g., laptop or notebook computer), and so on may comprise a mapping module, a projector, a camera, or a processor to determine whether an object touches a surface. Of course, such mobile devices are merely examples, and claimed subject matter is not limited in this respect.

In some embodiments, particular techniques for determining, among other things, whether an object touches a surface may provide a number of benefits. For example, a device, apparatus, or system for performing such techniques may include a camera and a projector and need not include an additional light sensor or an additional light source. Thus, a portable electronic device including a projector module and a camera module may perform a number of processes, such as those described in example embodiments herein. A device, apparatus, or system for performing such techniques may also be able to create a surface map of a surface on which a virtual keyboard, for example, may be displayed. Moreover, such a surface need not be flat, as explained below. Of course, such benefits are merely examples, and claimed subject matter is not so limited. Further, such benefits are merely a few of a number of other benefits.

FIG. 1 is a schematic block diagram of an electronic device 100, according to an embodiment. For example, electronic device 100 may comprise a portable device such as a smart phone, laptop computer, or PDA, just to name a few examples. Electronic device 100 may include a sensing device 110 to sense, detect, or determine any of a number of actions performed by a user of electronic device 100. For example, in one implementation, sensing device 110 may determine whether a user's finger or stylus touches a surface comprising a virtual keyboard. In such a case, device 110 may further determine which fingers of a user contact which virtual keys. In another implementation, sensing device 110 may determine or identify a gesture performed by a user's hand or finger over a surface comprising a virtual keyboard, for example.

Sensing device 110 may include a projector 120 for producing a projection image and a light pattern on a surface. In one implementation, projector 120 may comprise an RGB projector. In another implementation, projector 120 may comprise an RGB-IR projector, for example. Accordingly, in a particular implementation, a light pattern produced by projector 120 may comprise IR light, while a projection image produced by the projector may comprise visible light.

Sensing device 110 may also include a camera 130 to capture an image of the surface, an image of the light pattern, and an image of a touch object (e.g., an object, such as a finger or stylus, which may touch the surface). In one implementation, camera 130 may comprise a visible-IR camera, capable of capturing images produced by projector 120, for example.

A mapping module 145 may determine a mapping relationship between a projection image on the surface and a captured image of the surface, as described in detail below. A processor 140, which may include mapping module 145, may determine whether an object touches a surface based, at least in part, on an image of a light pattern.

For example, processor 140 may determine that an object does not touch a surface if an image of a light pattern includes one or more discontinuities. On the other hand, processor 140 may determine that an object touches a surface if an image of a light pattern does not include a discontinuity.

Figure 2:
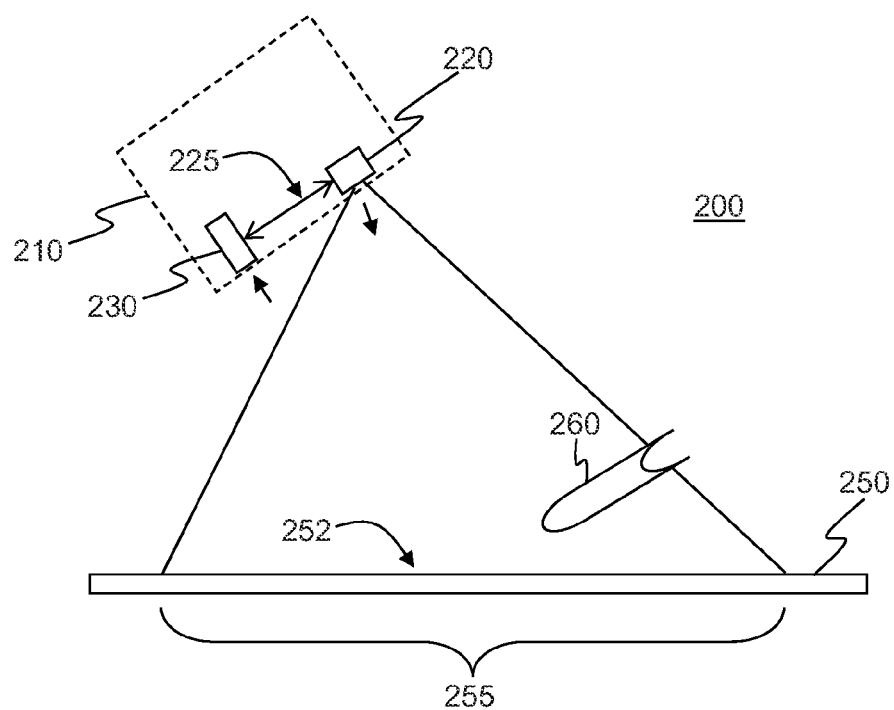
FIG. 2 is a schematic diagram of a projection-detection system, a touch object, and a surface, according to another embodiment.

FIG. 2 is a schematic diagram of a projection-detection system 210, a touch object 260, and a surface 250, according to an embodiment 200. For example, system 210 may comprise a portable device such as a smart phone, laptop computer, or PDA, just to name a few examples. System 210 may include a projector 220 for producing a projection image 252 on surface 250. Image 252 may comprise a virtual keyboard displayed on surface 250, which may comprise a sheet of paper, a desktop, or a notebook, just to name a few examples. Image 252 may cover an area 255, indicated in FIG. 2.

A camera 230 may capture image 252 on surface 250 and an image of touch object 260, which may comprise a finger or stylus of a user, for example. Camera 230 and projector 220 may be disposed in system 210 so as to be separated by a distance 225. Also, an optical axis of camera 230 or projector 220 may be substantially non-orthogonal with respect to surface 250. Accordingly, such a separation may prevent the projector and the camera from sharing the same optical path. For example, image 252 may be projected onto surface 250 by projector 220 at a particular angle with respect to surface 250. On the other hand, image 252 may be captured by camera 230 at a different angle with respect to surface 250. Accordingly, image 252 may appear differently as viewed from (a location of) projector 220 and camera 230. Such a difference may be used in a method to determine whether touch object 260 touches surface 250, as explained below.

Figure 3:
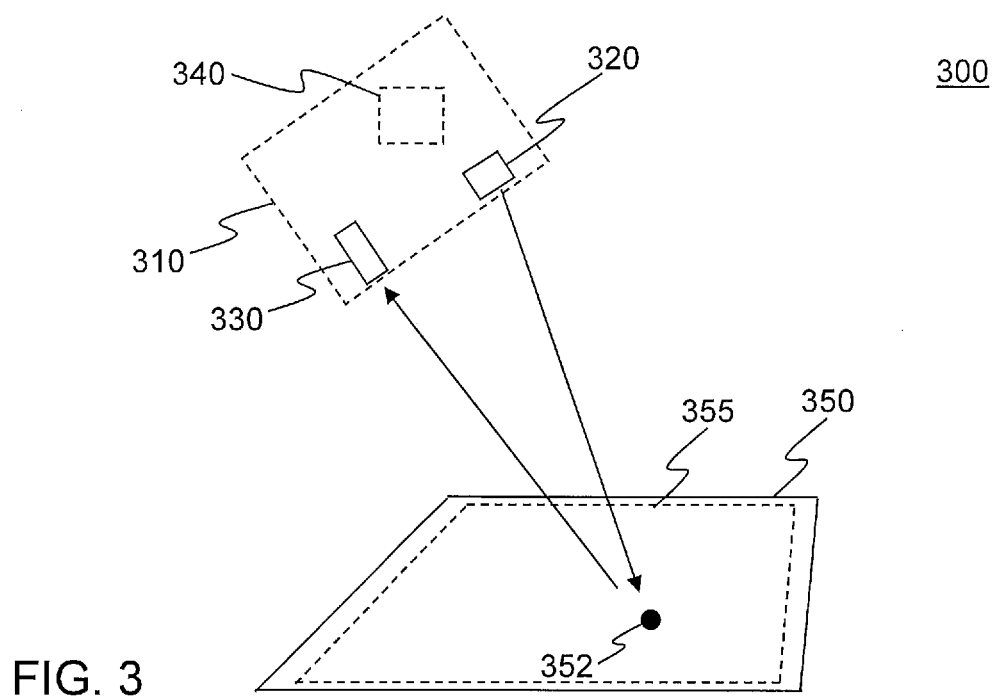
FIG. 3 is a schematic diagram of a projection-detection system and a surface, according to an embodiment.

FIG. 3 is a schematic diagram of a projection-detection system 310 and a surface 350, according to an embodiment. For example, system 310 may comprise a portable device such as a smart phone, laptop computer, or PDA, just to name a few examples. System 310 may include a projector 320 for producing a projection image 355 on surface 350. Image 355 may comprise a virtual keyboard or other image displayed on surface 350. In particular, image 355 may include an image portion 352. A camera 330 may be used to capture image 355 including portion 352. As indicated above, camera 330 and projector 320 may be separated by a distance that may prevent the projector and the camera from sharing the same optical path. Accordingly, image 355 may appear differently as viewed from (a location of) projector 320 and camera 330. In one embodiment, a transform function, for example, may be used to map portions, such as 352, of image 355 relative to projector 320 to image 355 relative to camera 330. For example, a transform function may be determined by the following relation:

$$\vec{X}_i' = H\vec{X}_i \qquad \text{Equation 1}$$

Here, $\vec{X}_i'$ may represent point i in position coordinates of image 355 with respect to projector 320, and $\vec{X}_i$ may represent the same point position coordinates of image 355 with respect to camera 330. Also, H may represent transformation variables, which may be based, at least in part, on a distance between projector 320 and camera 330. Such transformation variables may also be based, at least in part, on angles of optical axes of projector 320 and camera 330 with respect to surface 350, though claimed subject matter is not so limited. System 310 may include a processor 340 (which may include a mapping module, such as 145, shown in FIG. 1, for example) to execute one or more applications that may use Equation 1 to determine mapping between image 355 relative to projector 320 and image 355 relative to camera 330.

Figure 4:
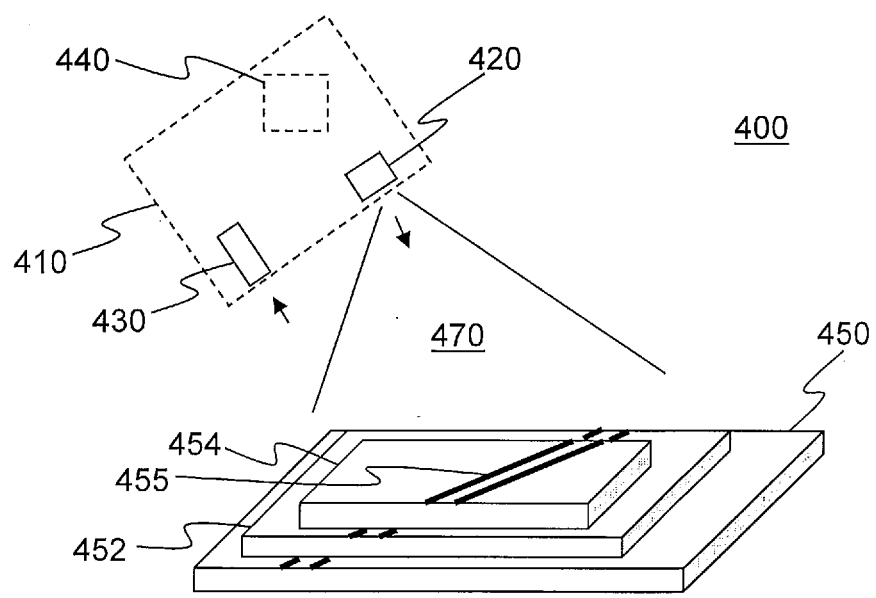
FIG. 4 is a schematic diagram of a projection-detection system and a surface, according to another embodiment.

FIG. 4 is a schematic diagram of a projection-detection system 410 and a non-flat surface 450, according to an embodiment 400. For example, system 410 may comprise a portable device such as a smart phone, laptop computer, or PDA, just to name a few examples. System 410 may include a projector 420 for producing a projection image on surface 450. Such an image may comprise a virtual keyboard or other image displayed on surface 350. Projector 420 may also produce a light pattern 455 on surface 450. As explained below, such a light pattern may be used to determine a surface geometric profile. Moreover, light pattern 455 may be used to scan a projection surface. After a scanning result has been acquired by camera 430, the surface geometry property may be determined and a corresponding transformation from camera space to projection space according to each point on the non-flat surface may be determined by one or more applications executed by processor 440, such as for Equation 1, for example.

Surface 450, in an embodiment, need not be flat. Here, surface 450 may include portions 452 and 454 that extend above other portions of surface 450. Light pattern 455 may be used by one or more applications executed by processor 440 to determine a shape or profile of surface 450. For example, light pattern 455 may be included in an image captured by camera 430. Light pattern 455 included in such an image may be different from a light pattern projected by projector 420. As mentioned above, this may be because camera 330 and projector 320 may be separated by a substantial distance (e.g., several millimeters to more than several centimeters). For example, projector 420 may project a light field 470 to produce a light pattern comprising multiple parallel straight lines. However, an image of a light pattern, as captured by camera 430, may appear different from the light pattern projected by projector 420. Such a difference may depend, at least in part, on a surface profile of surface 450.

Thus, straight lines of a light pattern projected by projector 420 may also be straight in an image of the light pattern captured by camera 430 if surface 450 is flat. However, such projected straight lines, as captured in an image taken by camera 430, may include discontinuities corresponding to steps in a surface profile of surface 450. Such steps in surface profile, for example, may occur, among other locations, between surface portions 452 and 454. In another example, such projected straight lines, as captured in an image taken by camera 430, may include curved lines corresponding to a curved surface profile of surface 450 (though such a curved surface profile is not shown).

Figure 5:
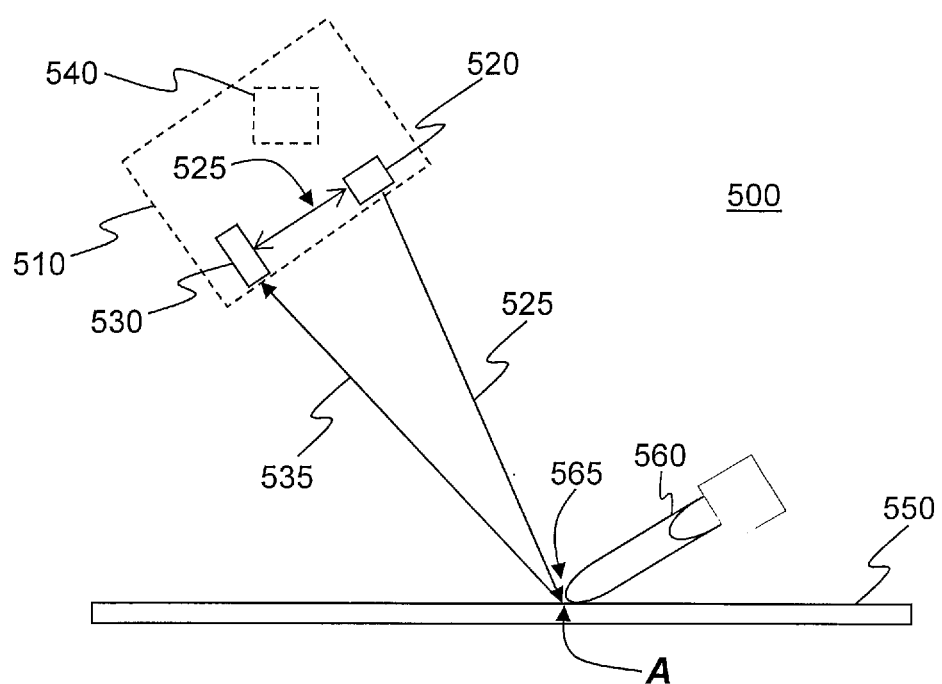
FIG. 5 is a schematic diagram of a projection-detection system, a touch object, and a surface, according to another embodiment.
Figure 6:
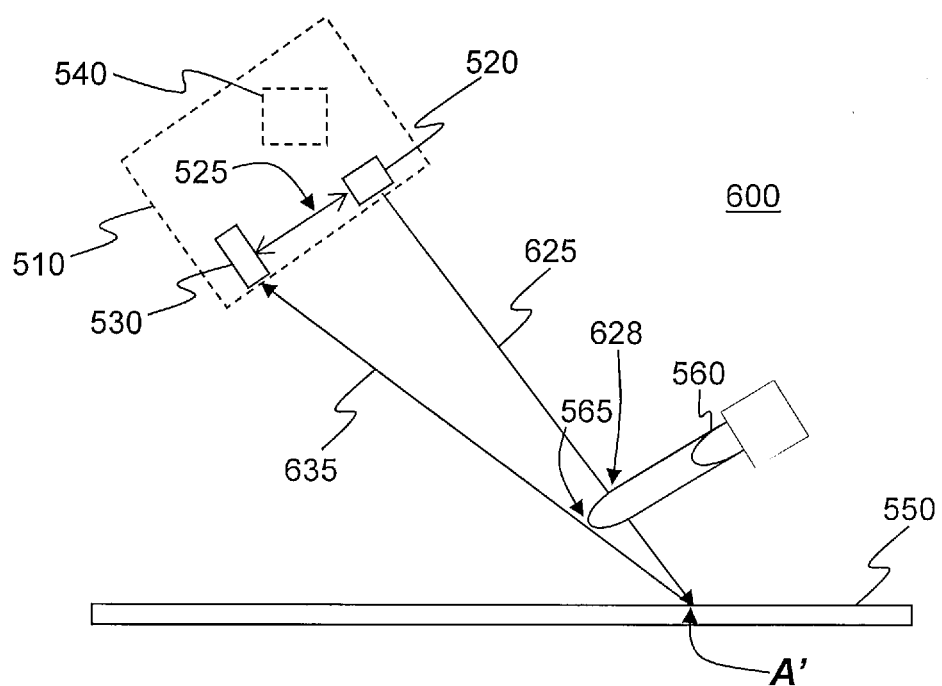
FIG. 6 is a schematic diagram of a projection-detection system, a touch object, and a surface, according to yet another embodiment.

FIGS. 5 and 6 are schematic diagrams of a projection-detection system 510, a touch object 560, and a surface 550, according to some embodiments. System 510 may include a projector 520 and a camera 530, for example. In FIG. 5, touch object 560 may be touching surface 550. In FIG. 6, touch object 560 may not be touching surface 550. As mentioned above, projector 520 and camera 530 being separated by some distance 525 may give rise to an image or pattern projected on surface 550 being different as viewed from projector 520 and camera 530. Manifestations of such a difference are now explained with respect to embodiments of FIGS. 5 and 6, for example.

In FIG. 5, camera 530 may capture an image of surface 550 and object 560, including tip 565. Arrow 535 may indicate an angle or direction at which camera 530 "sees" tip 565. An application executed by a processor 540 may determine that tip 565 is located at a point A on surface 550, for example. Accordingly, subsequent to determining a location of tip 565 (e.g., at point A), projector 520 may project an image of a small spot (or line, as in embodiments described for FIGS. 7-9, below) along arrow 525 to be located at point A. In this case, the projected spot and the tip 565 of object 560 may be co-located at point A. This may not be the case, however, if object 560 is not touching surface 550, as follows.

In FIG. 6, camera 530 may capture an image of surface 550 and object 560, including tip 565. Arrow 635 may indicate an angle or direction at which camera 530 "sees" tip 565. An application executed by processor 540 may determine that tip 565 is located at a point A' on surface 550, for example. In this case, point A' may not be co-located with tip 565 because object 560 (and tip 565) is elevated above surface 550. Accordingly, subsequent to determining a location of tip 565 (e.g., at point A'), projector 520 may project an image of a spot along arrow 625 to be located at point A'. In this case, the projected spot intersects object 560 at location 628 so that the projected spot is displayed on object 560. Subsequently, camera 530 may capture an image of object 560 including the projected spot. In the image, the projected spot and tip 565 of object 560 may be displaced from one another. Accordingly, the system may determine that object 560 is not touching surface 550 in response to detecting a projected spot on object 560 (as opposed to detecting the projected spot at tip 565), for example.

Figure 7:
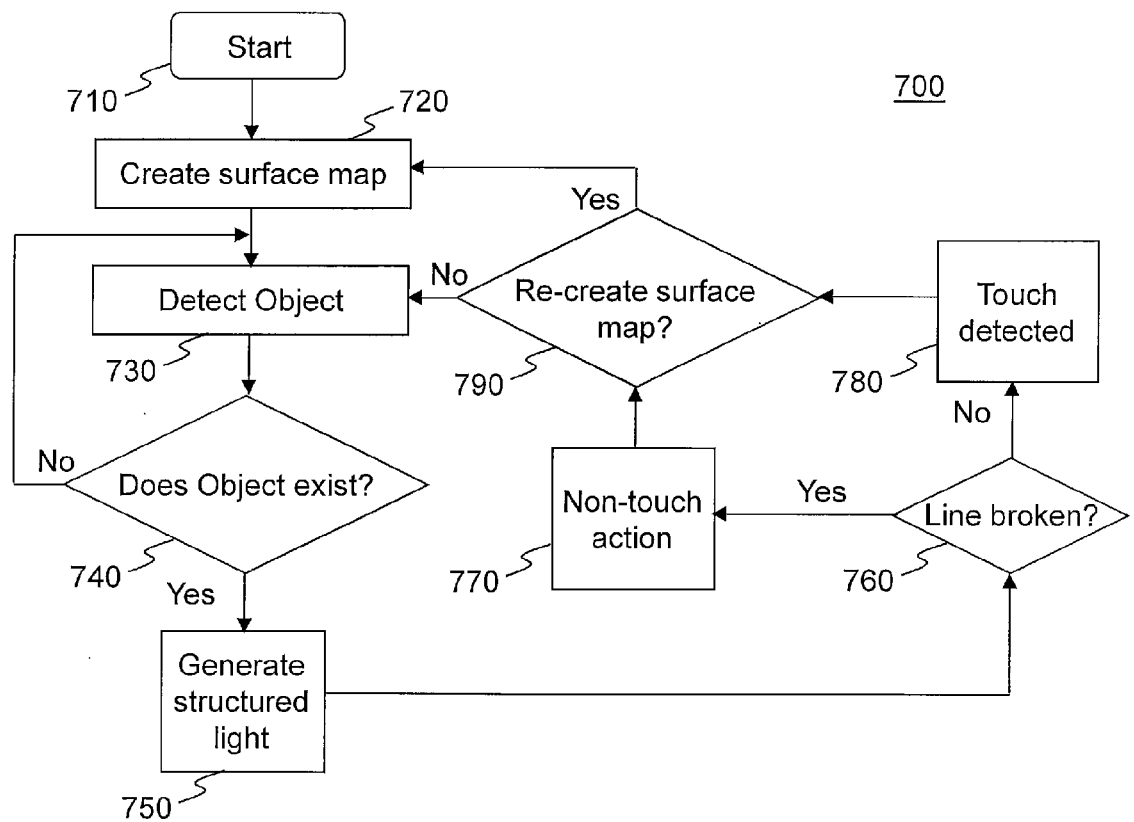
FIG. 7 is a flow diagram of a process to detect whether an object touches a surface, according to an embodiment.
Figure 8:
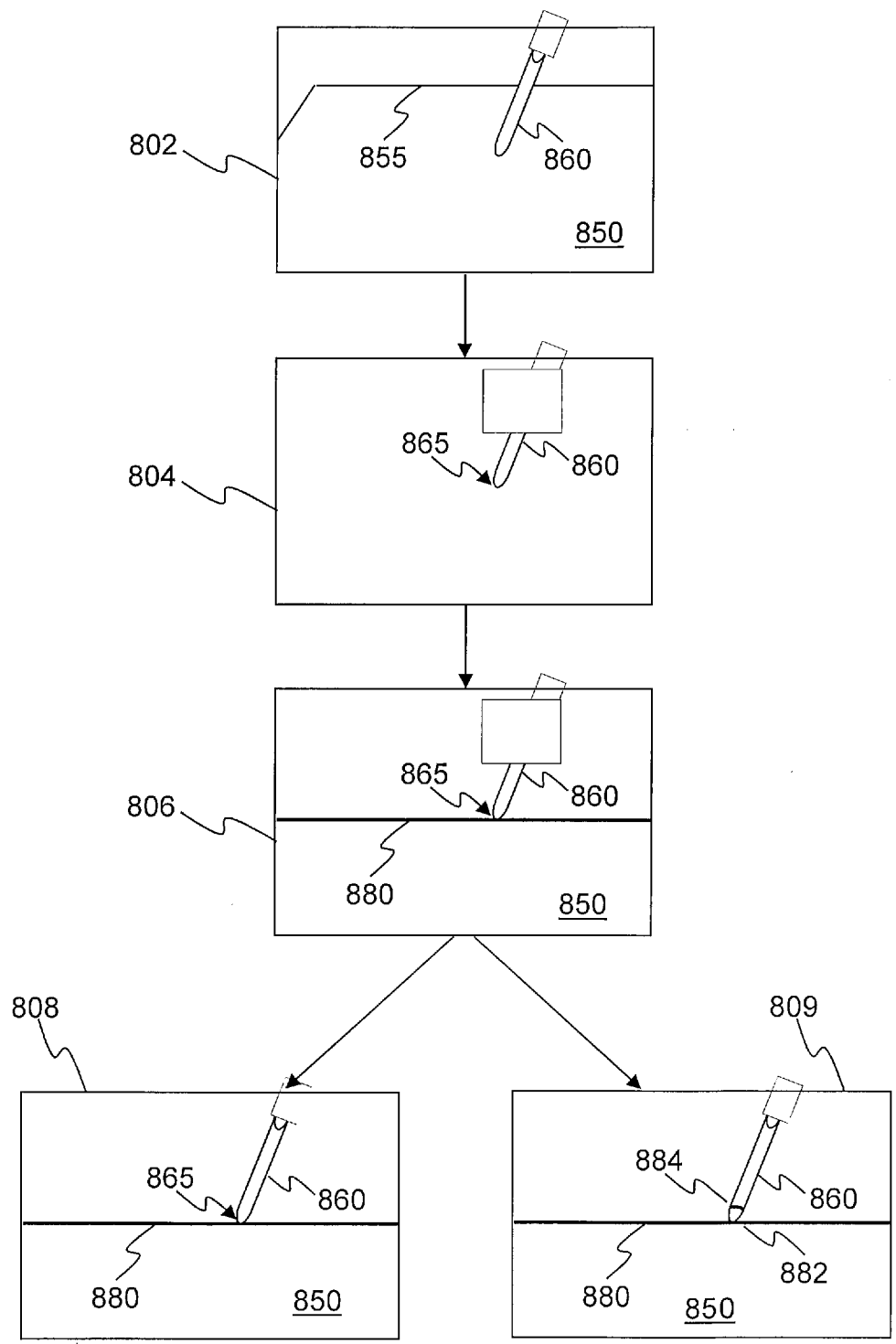
FIG. 8 is an image flow diagram of a process to detect whether an object touches a surface, according to an embodiment.

FIG. 7 is a flow diagram of a process 700 to detect whether an object touches a surface, according to an embodiment. FIG. 8 is an image flow diagram of process 700, according to one embodiment. At block 710, a system may begin process 700, which may be performed by a processor, such as 140 shown in FIG. 1, for example. At block 720, a surface map may be created to determine a profile of a surface 850 on which a virtual keyboard may be projected. An edge 855 of surface 850 is shown in image 802, for example. Adjustments may be made to a projected image of a virtual keyboard, for example, based, at least in part, on such a profile. As mentioned above, such a profile of surface 850 may affect the way projected light is displayed on the surface. For example, a particular outline of a portion of a virtual keyboard projected by a projector onto surface 850 may be unchanged if the surface is flat. However, such a particular outline may include discontinuities corresponding to steps in a surface profile of the surface. In another example, such a particular outline may include correspondingly curved lines to compensate for a curved surface profile of the surface 850. Accordingly, a processor, for example, may adjust or modify a projected image of a virtual keyboard, or other image, based, at least in part, on a profile of surface 850 that is to display the projected image.

At block 730, a camera may be used to detect a presence of an object 860. Such detection may be performed by comparing images 802 captured by the camera of surface 850 (which may include a projected virtual keyboard). A presence of an object may be determined if at least a portion of surface 850 (or a virtual keyboard) is obscured or blocked from view of the camera, for example. At diamond 740, if an object is not detected, process 700 may return to block 730, where the process continues to detect whether an object is present. If an object is detected, then process 700 may proceed to block 750, where structured light or a light pattern may be generated and projected by a projector, for example. Also, subsequent to object detection, a location of a tip 865 of the object 860 may be determined in an image 804 captured by the camera. A light pattern may comprise a straight line 880, which may be projected to be located at tip 865 of detected object 860. Structured light may be generated according to a pre-generated surface map H that transfers an object tip point location captured from a camera into a corresponding projection location. Structured light or a light pattern (e.g., line 880) may comprise IR light, invisible to a user, while a virtual keyboard, for example, displayed on surface 850 may comprise visible RGB light. Thus, a user need not see a line 880, which is intended for use by a sensing device, such as 110, and not a user. Accordingly, a camera in such a sensing device may be an RGB-IR camera.

Image 806 may comprise an image as "seen" by the projector of projecting line 880. However, an image of tip 865 and line 880 captured by the camera may be different for a case where tip 865 touches surface 850 versus a case where tip 865 does not touch surface 850. As mentioned above, a projector and a camera being separated by a distance may give rise to an image or pattern projected on a surface being different as viewed from the projector and the camera. Accordingly, image 808 comprises an image captured by the camera for the case where tip 865 is touching surface 850. Here, line 880 may be continuous, crossing object 860 at tip 865, for example. On the other hand, image 809 comprises an image captured by the camera for the case where tip 865 is not touching surface 850. Here, line 880 may include an interruption or discontinuity 882. Moreover, at least a portion 884 of line 880 may intersect object 860. The distance between 884 and tip 865 may be used to determine the distance between the tip point and the touch surface 850, for example.

Accordingly, returning to process 700, at diamond 760 a determination may be made as to whether line 880 is broken, such as by including one or more discontinuities. In one implementation, a processor may evaluate an image, such as image 808 or 809, to determine whether line 880 is broken, though claimed subject matter is not so limited. If line 880 is broken, then process 700 may proceed to block 770, where a determination may be made that tip 865 does not touch surface 850. On the other hand, if line 880 is not broken, then process 700 may proceed to block 780, where a determination may be made that tip 865 touches surface 850. In either case, process 700 may proceed to diamond 790, where a determination may be made as to whether a surface map is to be re-created. Re-creating a surface map may be useful from time to time or subsequent to a particular event where surface 850 may change. Such a decision to re-create a surface map may be made by a user or an application executed by a processor, for example. Process 700 may return to block 720 to re-create a surface map, or return to block 730 to again detect a presence of an object. Of course, such details of process 700 are merely examples, and claimed subject matter is not so limited.

Figure 9:
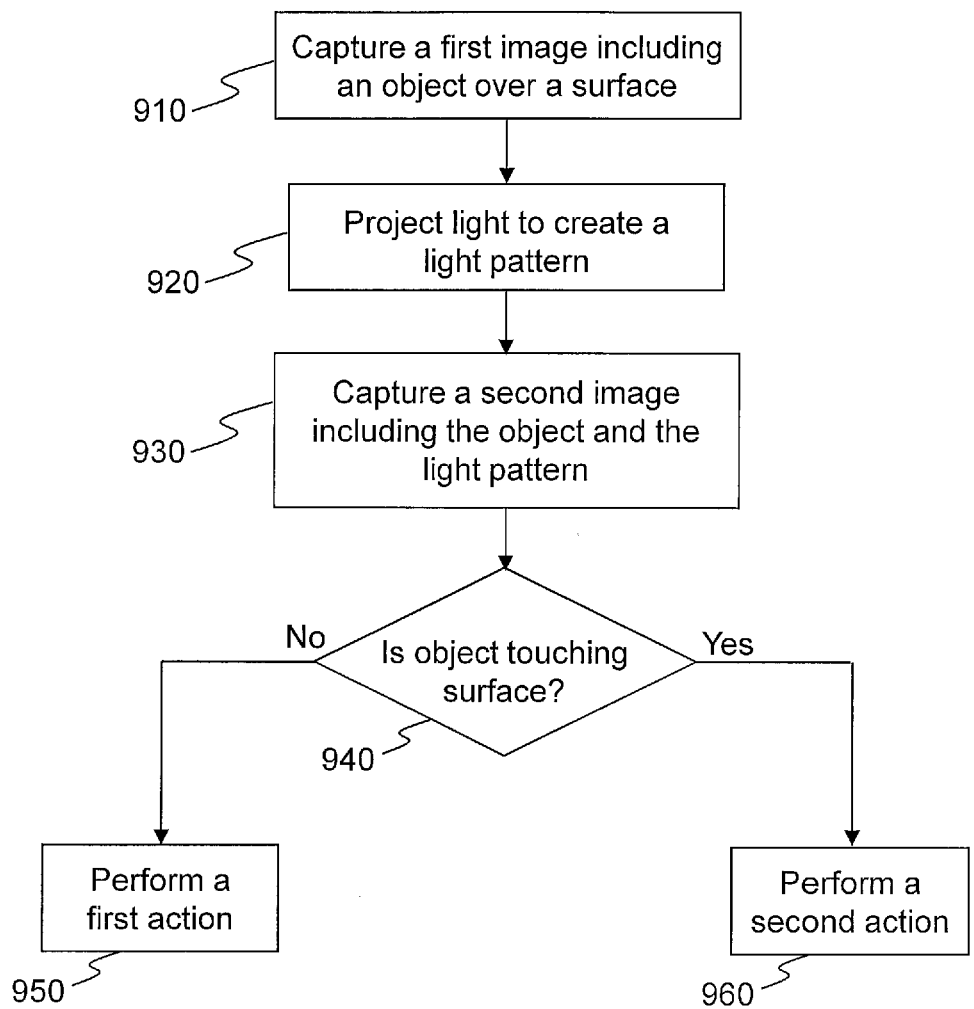
FIG. 9 is a flow diagram of a process to detect whether an object touches a surface, according to another embodiment.

FIG. 9 is a flow diagram of a process 900 to detect whether an object touches a surface, according to another embodiment. In block 910, a first image may be captured by a camera, such as camera 130, or other light sensing device, for example. A first image may include an image of an object over a surface. At block 920, light may be projected to create a light pattern on the surface. A pattern of such projected light may be based, at least in part, on the first image and a surface map of the surface, though claimed subject matter is not so limited. In one implementation, a projected light pattern may comprise a straight line on a flat surface.

At block 930, a second image may be captured by the camera. The second image may include an image of the object and an image of the projected light pattern. At diamond 940, a determination may be made as to whether the object touches the surface. In one implementation, the object may be determined to not be touching the surface if the light pattern in the second image includes one or more discontinuities, as explained above. On the other hand, the object may be determined to be touching the surface if the light pattern in the second image does not include a discontinuity. If the object is not touching the surface, then process 900 may proceed to block 950, where a particular action, such as by a processor, for example, may be performed. For example, a processor may take no action and merely wait until the object touches the surface (which may include a display of a projected virtual keyboard, for example). If the object is touching the surface, then process 900 may proceed to block 960, where a different particular action may be performed. For example, a processor may perform a particular action based, at least in part, on what portion (e.g., a location) of the surface (e.g., including a virtual keyboard) is touched. Of course, such details of process 900 are merely examples, and claimed subject matter is not so limited.

One skilled in the art will realize that a virtually unlimited number of variations to the above descriptions is possible, and that the examples and the accompanying figures are merely to illustrate one or more particular implementations.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method comprising:
   projecting, using a projector, an image portion on a surface, said image portion usable for surface mapping to enable transformation of location coordinates on said surface as seen by said projector to location coordinates on said surface as seen by a camera;
   capturing, using said camera, an image of said surface comprising said image portion;
   creating, using a processor, a surface map of said surface based at least in part on said captured image of said surface comprising said image portion;
   capturing, using said camera, a first image of an object proximate to said surface;
   determining, using said processor, a location of a tip of said object relative to said surface in said first image based, at least in part, on said surface map;
   projecting, using said projector, a light pattern to be located at said location of said tip and said surface, said light pattern being determined based, at least in part, on said first image and said surface map to transform said location of said tip captured from said camera to a corresponding projection location of said surface;
   capturing a second image of said light pattern superimposed on said object and/or said surface;
   determining whether said object touches said surface based, at least in part, on said second image.

2. The method of claim 1, wherein said determining whether said object touches said surface further comprises:
   determining that said object touches said surface in response to a determination that said light pattern in said second image does not include a discontinuity.

3. The method of claim 2, wherein said determining whether said object touches said surface further comprises:
   determining that said object does not touch said surface in response to a determination that said light pattern in said second image includes one or more discontinuities.

4. The method of claim 1, wherein said determining whether said object touches said surface further comprises:
   determining that said object does not touch said surface in response to a determination that said light pattern in said second image intercepts said object.

5. The method of claim 1, further comprising:
   determining a surface map mapping relationship between said surface and said camera and said projector.

6. The method of claim 1, wherein said light pattern comprises infrared (IR) light.

7. The method of claim 1, wherein said projected light pattern comprises a straight line on a flat surface.

8. The method of claim 1, further comprising:
   responding to a user action based, at least in part, on said determined location of said tip of said object and a determination of whether said tip of said object touches said surface.

9. The method of claim 1, wherein determining whether said object touches said surface comprises:
   determining that said object touches said surface in response to a determination that said light pattern is superimposed on said surface at said determined location; and
   determining that said object does not touch said surface in response to a determination that said light pattern is superimposed on said object at said determined location.

10. The method of claim 1, wherein determining said location of said tip of said object is based, at least in part, on a distance between said camera and said projector.

11. A touch sensing device comprising:
    a projector to project a projection image on a surface, said image to comprise an image portion usable for surface mapping to enable transformation of location coordinates on said surface as seen by said projector to location coordinates on said surface as seen by a camera;
    said camera to capture an image of said surface comprising said image portion;
    a processor to create a surface map of said surface based at least in part on said captured image of said surface comprising said image portion;
    wherein said camera is to capture a first image of an object proximate to said surface;
    wherein said processor is further to determine a location of a tip of said object relative to said surface in said first image based, at least in part, on said surface map;
    said projector to project a light pattern to said surface, wherein said light pattern is to be projected to said tip and said surface, said light pattern to be determined based, at least in part, on said first image and said surface map to transform said location of said tip captured from said camera to a corresponding projection location of said surface;
    said camera to capture an image of said light pattern; and
    said processor to determine whether said tip of said object touches said surface based, at least in part, on said image of said light pattern.

12. The device of claim 11, wherein said processor is to determine that said tip of said object does not touch said surface in response to a determination that said image of said light pattern includes one or more discontinuities, and wherein said processor is to determine that said tip of said object touches said surface in response to a determination that said image of said light pattern does not include a discontinuity.

13. The device of claim 11, wherein an optical axis of said camera is substantially non-orthogonal with respect to said surface.

14. The device of claim 11, wherein said light pattern comprises infrared (IR) light, visible light, or a combination thereof.

15. The device of claim 11, wherein said projector comprises a red-green-blue (RGB) projector.

16. The device of claim 11, wherein said projector comprises an RGB-IR projector.

17. The device of claim 11, wherein said camera comprises a visible-IR camera.

18. The device of claim 11, wherein said device is incorporated in a mobile device.

19. The device of claim 11, wherein said surface map is based, at least in part, on a separation distance between said camera and said projector and a relative position to said surface.

* * * * *